United States Patent
Oblizajek

(10) Patent No.: US 10,997,708 B2
(45) Date of Patent: May 4, 2021

(54) QUANTIFYING TREAD RIB EDGE LOCATIONS

(71) Applicant: GM GLOBAL TECHNOLOGY OPERATIONS LLC, Detroit, MI (US)

(72) Inventor: Kenneth L. Oblizajek, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 308 days.

(21) Appl. No.: 15/944,024

(22) Filed: Apr. 3, 2018

(65) Prior Publication Data
US 2019/0304084 A1 Oct. 3, 2019

(51) Int. Cl.
*G06T 7/13* (2017.01)
*G06T 7/00* (2017.01)
*B60C 25/00* (2006.01)

(52) U.S. Cl.
CPC .......... *G06T 7/0006* (2013.01); *B60C 25/007* (2013.01); *G06T 7/13* (2017.01)

(58) Field of Classification Search
CPC .......... G06T 7/13; G06T 7/00; G06T 7/0006; G06T 2207/30164; G06K 9/4604; G06K 9/6202; H04N 7/183; B60C 25/00; B60C 25/007; B60C 25/002; B60C 11/246; B60C 11/243; B60C 2019/004; G06F 16/583
See application file for complete search history.

(56) References Cited

U.S. PATENT DOCUMENTS

| | | | | |
|---|---|---|---|---|
| 7,043,396 B2* | 5/2006 | Larson | ............... | G01B 21/26 33/203.14 |
| 7,168,308 B2* | 1/2007 | Mancosu | ............ | B60C 23/0411 340/445 |
| 8,661,885 B1* | 3/2014 | Singh | ................... | B60C 23/064 73/146 |
| 2013/0278406 A1* | 10/2013 | Weston | ............... | B60C 23/0488 340/442 |
| 2013/0327135 A1 | 12/2013 | Russell | | |
| 2014/0005956 A1* | 1/2014 | Patel | ................... | B60C 23/064 702/41 |

(Continued)

FOREIGN PATENT DOCUMENTS

| CN | 102180070 A | 9/2011 |
|---|---|---|
| CN | 102445352 A | 5/2012 |

(Continued)

OTHER PUBLICATIONS

Chandrashekar, Experimental Measurement of On-Vehicle Rolling Tire Contact Patch Shear Energy Intensity at Various Slip Angles, 2017.*

(Continued)

*Primary Examiner* — Gregory J Toatley, Jr.
*Assistant Examiner* — Lynda Dinh
(74) *Attorney, Agent, or Firm* — Cantor Colburn LLP

(57) ABSTRACT

A computer-implemented method, an apparatus and a computer-program product for determining a quality of a tire. The apparatus includes a sensor array configured to obtain a footprint of the tire, and a processor. The processor determines an intensity profile of the footprint, locates an edge of a tread rib of the tire from the change in intensity, and determines from the location of the tread rib edge a relative quality of the tire.

14 Claims, 9 Drawing Sheets

(56) References Cited

U.S. PATENT DOCUMENTS

2014/0288859 A1* 9/2014 Wittmann ................. G06T 7/60
702/55

FOREIGN PATENT DOCUMENTS

CN 103347712 A 10/2013
CN 103984849 A 8/2014

OTHER PUBLICATIONS

Chandrashekar, et al., "Experimental Measurement of On-Vehicle Rolling Tire Contact Patch Shear Energy Intensity at Various Slip Angles", Master Thesis, Charlotte, North Carolina, 2017, 57 Pages.
German Office Action Issued in DE Application No. 003.2274DE, dated Aug. 13, 2020, 4 Pages.
Wikipedia, Kantendetektion, Accessed: Aug. 13, 2020, 2 Pages. URL: https://de.wikipedia.org/w/index.php?title=Kantendetektion&oldid=158950046%E2%80%9C.
Chinese Office Action Issued in CN Appliation No. 201910215260.3, dated Nov. 17, 2020, 6 Pages.

* cited by examiner

QUANTIFYING TREAD RIB EDGE LOCATIONS

BACKGROUND OF THE INVENTION

The subject disclosure relates to a method and apparatus for determining a quality of a tire and, in particular, to an apparatus and method for determining the locations of tread rib edges on a tire.

Certain characteristics of tire force generation are related to the positions of tread rib edges as a function of their transverse position along the tire. Groove wander, for example, is the relatively low frequency vibratory experience arising from variations of lateral force of a tire due to the tread ribs of the tire acting against rain grooves and/or contoured deformations in a road's surface. The varying interactive engagement of multiple tread rib edges and rain groove edges dependent on the relative spatial position and orientation of multiple tread rib edges and multiple rain groove edges results in a lateral dynamic force variation, producing unwanted vibratory motions of the vehicle. This varying engagement occurs as the vehicle encounters various aggregations of rain grooves with the tires during normal transverse movement of the vehicle either within the lane or during intentional lane transitions. The disturbing vehicle motions arise, then from the interaction of the tread rib edges and the rain groove edges, and can be suppressed by management of the relative positioning of the rain groove edges and the tread rib edges. Since the position of rain groove edges are not readily changed, owing to the extensive lane-miles of existing roadways featuring these rain grooves and the accepted practices for newly constructed highways, the position of tire tread rib edges are commonly manipulated to diminish vibrations. Knowing the tread rib widths and location of the tread rib edges of a tire can help to reduce these vibratory motions or identify the tire characteristics that can be manipulated in suppression of the unwanted motions. Accordingly, it is desirable to provide a system and method for determining a location of a tread rib edge of a tire.

SUMMARY

In one exemplary embodiment, a computer-implemented method of determining a quality of a tire is disclosed. The method includes obtaining a footprint of the tire at a sensor array, determining an intensity profile of the footprint, locating an edge of a tread rib of the tire from the change in intensity, and determining from the location of the tread rib edge a relative quality of the tire.

In addition to one or more of the features described herein, the method includes obtaining the footprint at the sensor array by one of applying the tire to a face of the sensor array with static load, and rolling the tire across the face of the sensor array. Also, when the footprint is obtained at a misalignment angle to a coordinate axis of the sensor array and a geometric transformation is applied to align the footprint with the coordinate axis. At the misalignment angle, a tread rib location is determined within a resolution beyond the resolution of the sensor array by obtaining the footprint at the misalignment angle.

The method further includes cropping the footprint about a centroid of the footprint. The intensity profile is an intensity along a direction transverse to the tread ribs of the tire and the intensity at a selected location is an average of intensities record along a tread rib direction at the selected location. The tread rib edge is located from a location of an extremum of a derivative of the intensity profile.

In another exemplary embodiment, an apparatus for determining a quality of a tire is disclosed. The apparatus includes a sensor array configured to obtain a footprint of the tire, and a processor. The processor is configured to determine an intensity profile of the footprint, locate an edge of a tread rib of the tire from the change in intensity, and determine from the location of the tread rib edge a relative quality of the tire.

In addition to one or more of the features described herein, the sensor array is configured to receive an impression of the footprint as one of the tire being applied to a face of the sensor array with static load, and the tire being rolled across the face of the sensor array. When the sensor array receives the footprint at a misalignment angle to a coordinate axis of the sensor array, the processor is further configured to apply a geometric transformation to align the footprint with the coordinate axis. The processor determines a tread rib location within a resolution beyond the resolution of the sensor array using the misalignment of the tire with the coordinate axis of the sensor array. The processor is further configured to crop the footprint about a centroid of the footprint. The processor creates the intensity profile along a direction transverse to the tread ribs of the tire wherein the intensity at a selected location is an average of intensities recorded along a tread rib direction at the selected location. The processor locates the edge from a location of an extremum of a derivative of the intensity profile.

In yet another exemplary embodiment, a computer-program product for determining a quality of a tire is disclosed. The computer program product includes a computer readable storage medium that has computer executable instructions stored therein. The computer readable storage medium includes instructions to obtain a footprint of the tire at a sensor array, determine an intensity profile of the footprint, locate an edge of a tread rib of the tire from the change in intensity, and determine from the location of the tread rib edge a relative quality of the tire.

In addition to one or more of the features described herein, the computer readable storage medium further includes instructions to obtain the footprint at a misalignment angle to a coordinate axis of the sensor array and apply a geometric transformation to align the footprint with the coordinate axis. Further instructions determine a tread rib location within a resolution beyond the resolution of the sensor array by obtaining the footprint at the misalignment angle. The footprint is cropped about a centroid of the footprint. The intensity profile is created along a direction transverse to the tread ribs of the tire, whereas the intensity at a selected location is an average of intensities record along a tread rib direction at the selected location. The tread rib edge is located from a location of an extremum of a derivative of the intensity profile.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1A:
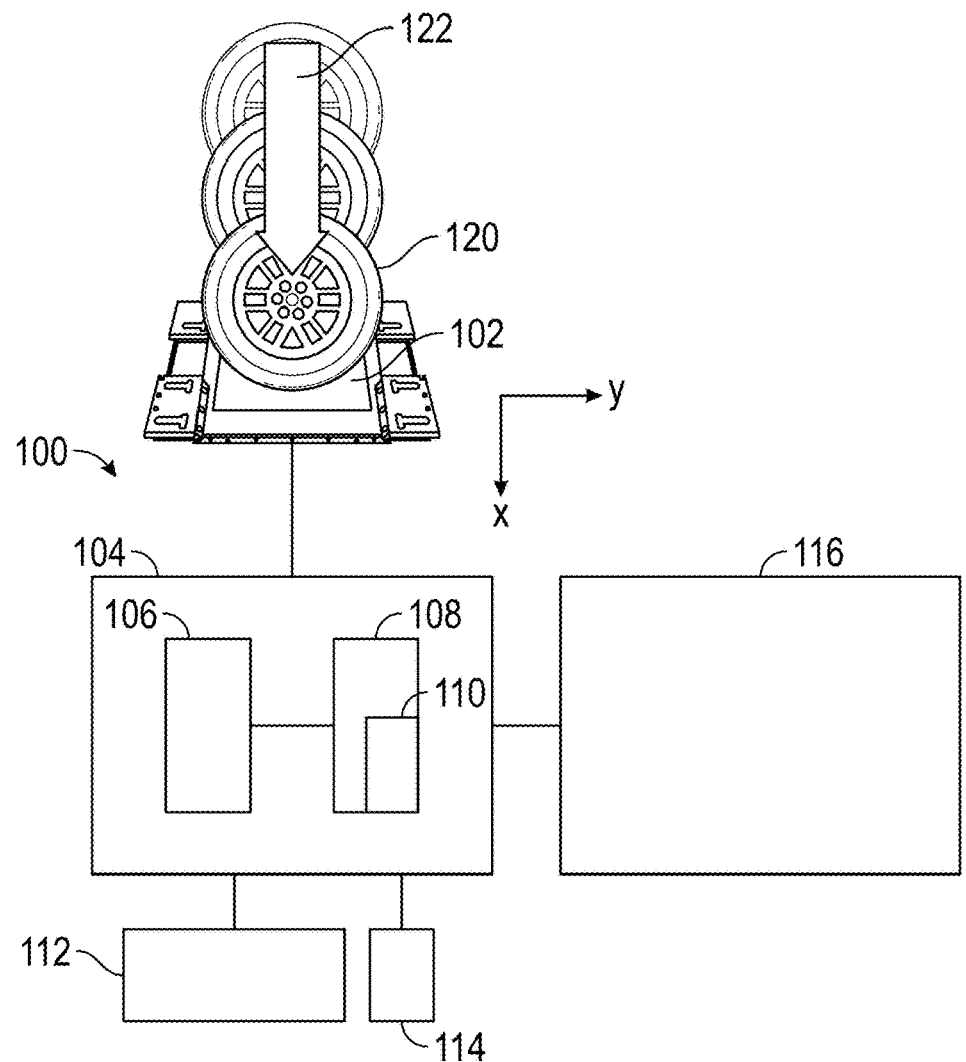
FIG. 1A shows a tire imaging apparatus for obtaining a digital footprint of a tire.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1A shows a tire imaging apparatus 100 for obtaining a digital footprint of a tire 120. The imaging apparatus 100 includes a sensor array 102 and a control unit 104. The sensor array 102 is an N×M array of pixels formed in a two-dimensional plane. For illustrative purposes only, N=M=256. In various embodiments, the resolution of the array is 0.040"×0.040". Each pixel includes a measurement device or transducer such as, for example a piezoelectric transducer, a resistive transducer, a capacitive transducer or other electrical device that provide a voltage or current in proportion to an amount of force or pressure exerted on the device. The control unit 104 includes a processor 106 in communication with the sensor array 102. The processor 106 receives signals from each of the transducers of the sensor array 102 and provides an image of a footprint of the tire 120 to a display 116 or graphic user interface. In various embodiments, the display 116 is a touchscreen display that allows input to the processor 106 by an operator touching the display 116, thereby allowing the operator to manipulate the image at the display 116. The processor 106 can also store the image to a database or memory location 108. The memory location 108 also stores various programs 110 that, when read by the processor 106, cause the processor 106 to perform methods disclosed herein for determining a location of tread ribs and their edges; also referred to herein as rib edges. The processor 106 can also be in communication with various input devices, such as a keyboard 112 and/or a mouse 114. The processor 106 can also provide an output indicating a quality of the tire based on the location of the rib edges.

FIG. 1A illustrates a first method for obtaining a digital footprint of the tire 120 at the imaging apparatus 100. An x-axis and y-axis of the sensor array 102 are shown. The sensor array 102 is placed so that the plane of the sensor array 102 is horizontal in order to support the tire 120. In the first method, the tire 120 is placed on the sensor array 102 and a static load 122 is applied in a vertical direction in order to press the tire 120 against the sensor array 102. Each pixel of the sensor array 102 provides a signal indicating a force and/or pressure on the pixel by the tire 120. The signal provides a location or position (x,y) of the pixel and an intensity z(x,y) for the pixel.

Figure 1B:
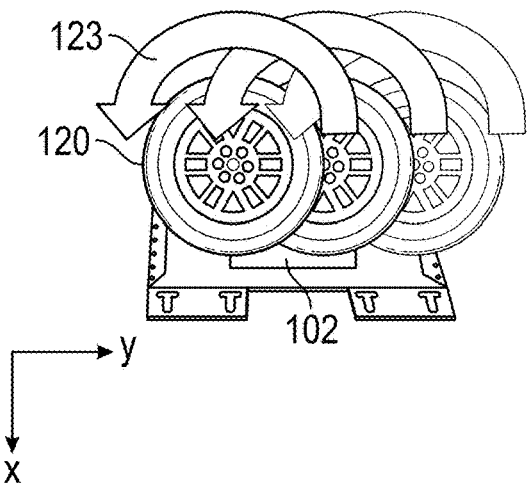
FIG. 1B illustrates a second method for obtaining a digital footprint of the tire.

FIG. 1B illustrates a second method for obtaining a digital footprint of the tire 120. In the second method, the tire 120 is rolled 123 across the surface of the sensor array 102 with a constant vertical load 122 applied. An x-axis and y-axis of the sensor array 102 are shown. In one embodiment, the tire 120 is rolled along a selected axis of the sensor array 102, such as the y-axis.

In yet another embodiment, ink can be applied to the tire 120 and the tire can be pressed against, or rolled over, a surface in order to leave a footprint. A camera with a photosensitive array at its imaging plane can be used to obtain a digital image of the inked footprint that can be sent to the processor 106. Once the footprint has been captured at the sensor array 102, the processor 106 can perform the methods disclosed below to determine rib edge or tread rib edge as well as tire quality.

Figure 2:
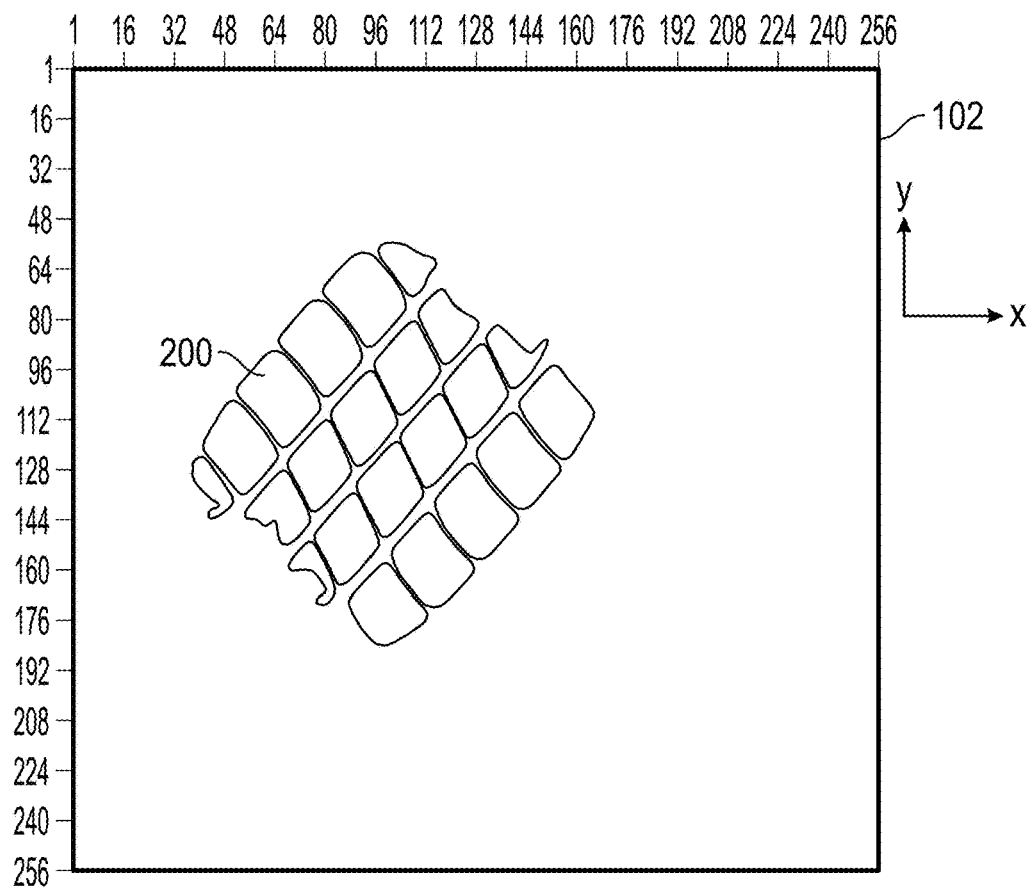
FIG. 2 shows a footprint of a tire obtained at the sensor array.

FIG. 2 shows a footprint 200 of a tire obtained at the sensor array 102. Rather than being aligned along the x-y coordinate axes, the footprint 200 is at an angle to the coordinate axes; referred to herein as a misalignment angle. This misalignment of the footprint with the coordinate axes of the sensor array can be due to several reasons, such as positioning misalignment of the imaging apparatus 100 during measurement. Alternatively, the footprint may be intentionally misaligned in order to improve a resolution of the footprint, as discussed below with respect to FIGS. 3, 4 and 4A.

Figure 3:
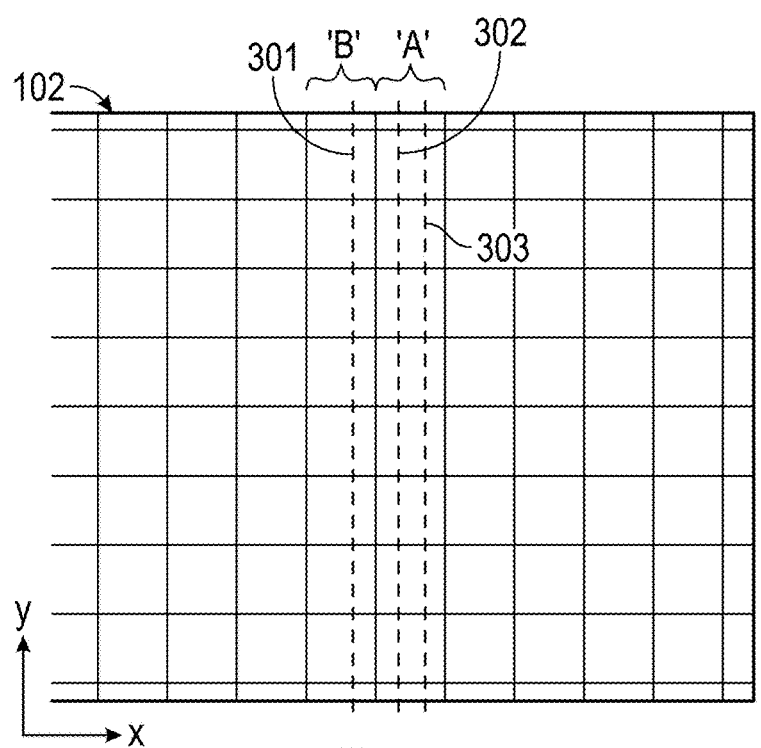
FIG. 3 shows a close-up of the sensor array showing pixels of the sensor array.
Figure 4A:
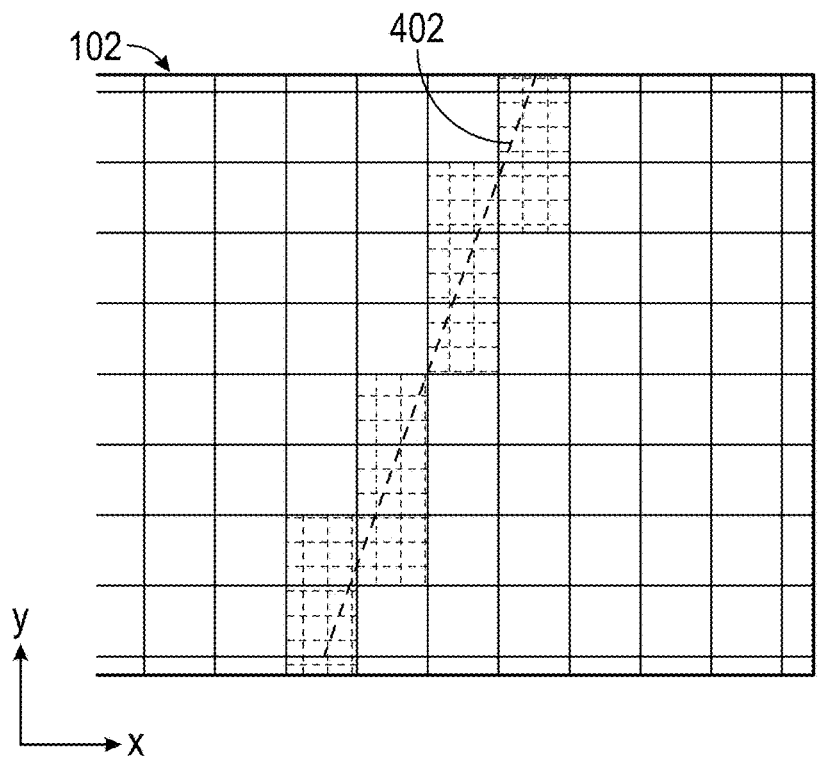
FIG. 4A shows a diagonal line that is not aligned with the coordinate axes of the sensor array FIG. 4B further shows a diagonal line that is parallel to the diagonal line of FIG. 4A and separated by a selected distance.

FIGS. 3, 4 and 4A illustrate the use of tire misalignment with respect to the coordinate axes of the sensor array 102 in order to overcome a resolution constraint of the sensor array 102. FIG. 3 shows a close-up of the sensor array 102 showing pixels of the sensor array 102. A column 'A' of pixels and a column 'B' of pixels are shown. Vertical lines 301, 302 and 303 indicate possible locations of features such as a rib edge when the tread ribs of the tire are aligned along the y-axis. Vertical lines 302 and 303 have a distance between them that is less than the width of the pixel and are therefore both recorded only by the pixels in column 'A' despite their spatial separation. Line 301 is recorded only by the pixels in column B.

Figure 4B:
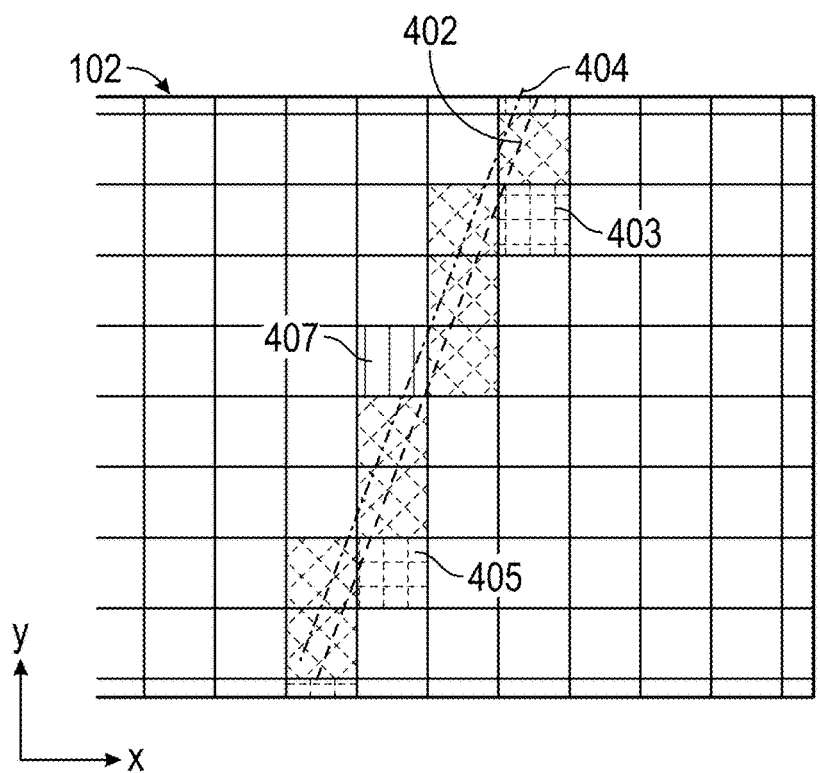

FIG. 4A shows a diagonal line 402 that is not aligned with the coordinate axes of the sensor array 102. The diagonal line represents the location of a feature such as a rib edge of the tire when the tread ribs of the tire are misaligned with the coordinate axes. The diagonal line 402 crosses many pixel columns. By observing which pixels are registered, one can determine a slope of the line. FIG. 4B further shows a diagonal line 404 that is parallel to diagonal line 402 and is separated from diagonal line 402 by a same amount that separates lines 302 and 303 of FIG. 3. However, while diagonal line 402 and diagonal line 404 are recorded by some of the same pixels, pixels 403 and 405 record only the diagonal line 402 while pixel 407 records only diagonal line 404. This difference in those pixels that record only one of the diagonal lines allows one to resolve diagonal line 402 from diagonal line 404 at a resolution scale finer than the resolution scale provided by the size of the pixels of the array in an aligned footprint. Since the corresponding lines 302 and 303 of FIG. 3 cannot be resolved, this method of misalignment clearly provides an increase in resolution.

In order to determine rib edges, the misaligned footprint is centered and rotated into alignment with the coordinate axes of the sensor array 102. The footprint is then cropped in preparation for intensity profiling. This centering, rotation and cropping can be performed automatically by the processor (106, FIG. 1A) using the methods discussed herein with respect to FIGS. 5-6. Alternatively, these steps can be performed by an operator using the methods discussed herein with respect to FIG. 7-8.

Figure 5:
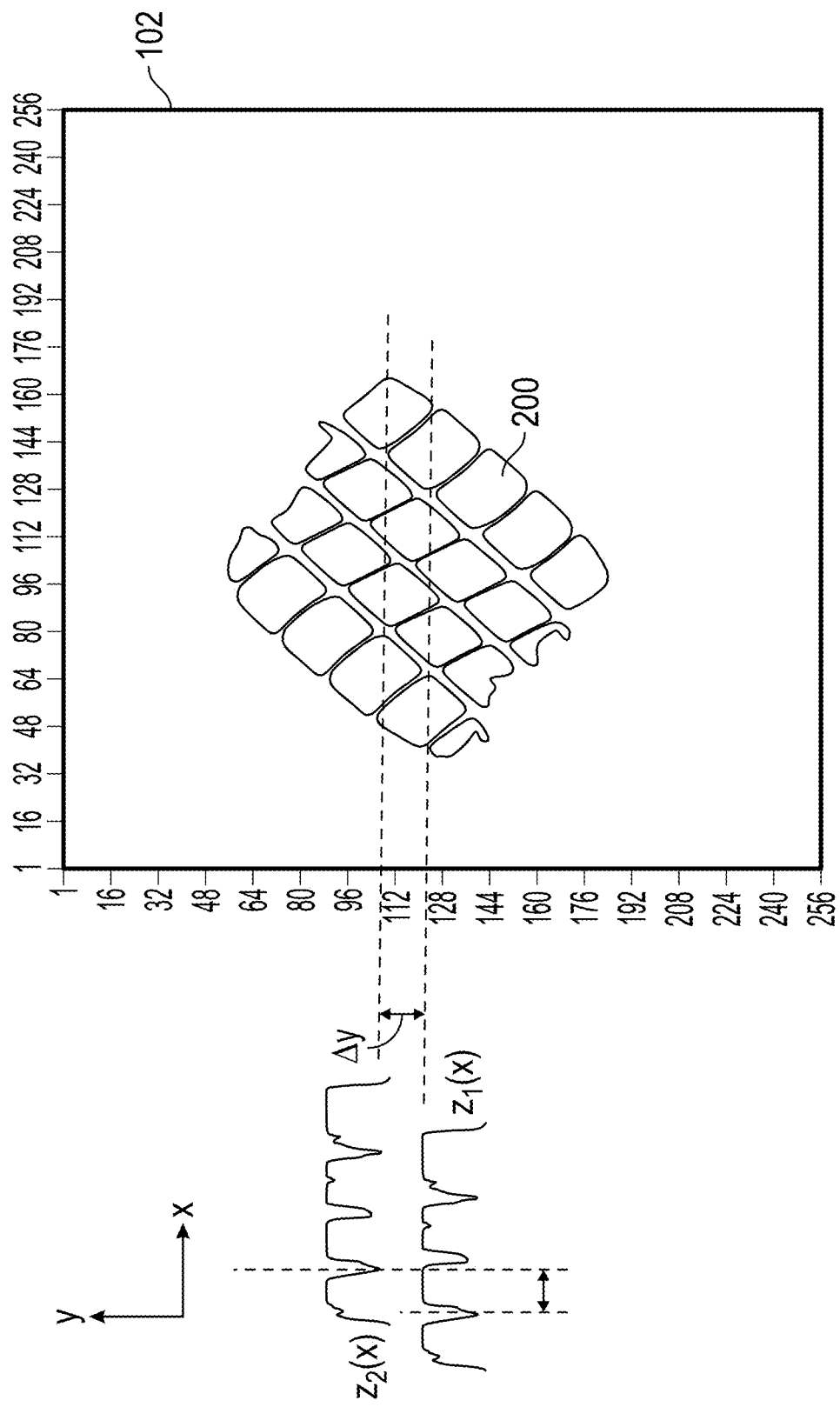
FIG. 5 illustrates a method of determining a misalignment angle of the footprint using a processor.

FIG. 5 illustrates a method of determining a misalignment angle of the footprint using a processor. The processor (106, FIG. 1A) selects a first and a second position along the y-axis at which to obtain an intensity profile of the footprint 200. In general, the first and second position are selected so that horizontal lines drawn at the first and second position pass through the sides of the tire in order to obtain intensity profiles that extend across the tire. An intensity profile of the footprint is captured at each of the first and second positions by recording the intensity along the x-axis. FIG. 5 show intensity profile $z_1(x)$ and intensity profile $z_2(x)$ separated along the y-axis by a distance $\Delta y$. Since $z_1(x)$ and $z_2(x)$ are similar intensity profiles, the processor 106 can perform a cross-correlation on the intensity profiles as shown in Eq. (1):

$$\tau_{dmax} = \underset{\tau}{\operatorname{argmax}}\left(\int z_1(x)z_2(x-\tau)dx\right) \quad \text{Eq. (1)}$$

where $\tau_{d\ max}$ is a distance moved by $z_2(x)$ with respect to $z_1(x)$ to obtain a maximum of the cross-correlation function. While FIG. 5 shows only two intensity profiles obtained by two intensity profile scans along the x-axis, any number of scans can be used to obtain a best-fit of the values of $\tau_{d\ max}$. The distance $\tau_{d\ max}$ is related to the distance $\Delta y$ via a misalignment angle $\theta$ and can therefore by used to determine the misalignment angle $\theta$ using Eq. (2):

$$\theta = \tan^{-1}\left(\frac{\tau_{dmax}}{\Delta y}\right) \quad \text{Eq. (2)}$$

Figure 6:
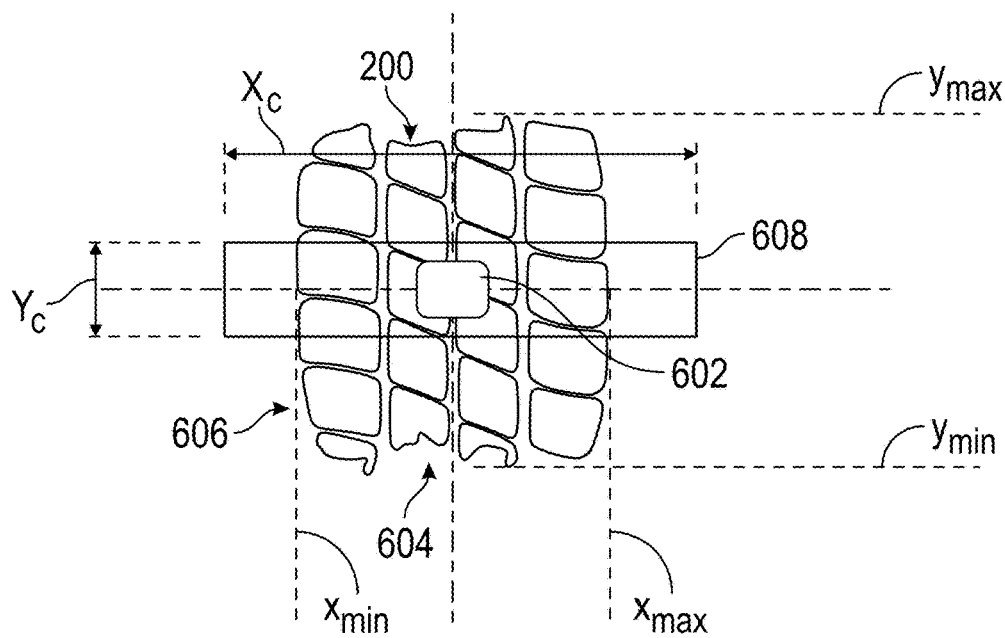
FIG. 6 illustrates a method of cropping of the footprint using a processor.

Once the misalignment angle $\theta$ has been determined, the footprint can be rotated along the axes of the sensor array 102. After rotating the footprint, a centroid (602, FIG. 6) or geometric center of the footprint can be determined using an averaging method shown in Eqs. (3) and (4):

$$x_{00} = \frac{\int x \cdot z(x,y)dxdy}{\int z(x,y)dxdy} \quad \text{Eq. (3)}$$

and $$y_{00} = \frac{\int y \cdot z(x,y)dxdy}{\int z(x,y)dxdy} \quad \text{Eq. (4)}$$

where $(x_{00}, y_{00})$ are the coordinates of the centroid (602, FIG. 6). The centroid (602, FIG. 6) can be used to center the image of the foot print or when cropping the footprint. Although the above equations are written for continuous functions with integral operations, and represent mathematical transformations, the corresponding operations for discrete functions using summations instead of integrals are equally valid, and can be used in place of the integral forms for the discrete transducer measurements.

FIG. 6 illustrates a method of cropping of the footprint 200 using a processor. Cropping the footprint 200 eliminates contact variations that occur at the lower extremity ($y_{min}$) and upper extremity ($y_{max}$) of the footprint 200 such as variation 604. Cropping the footprint 200 also eliminates or reduces the rounding that occurs along the leftmost edge ($x_{min}$) and the rightmost edge ($x_{max}$), such as rounding 606.

With the footprint 200 aligned along the coordinate axes of the sensor array 102, the processor 106 determines the leftmost extremity ($x_{min}$) and rightmost extremity ($x_{max}$) of the footprint 200 along the x-axis as well as the lower extremity ($y_{min}$) and the upper extremity ($y_{max}$) of the footprint 200 along the y-axis. These extremities can be determined by measuring a mean intensity profile along the x-axis and y-axis, respectively. The upper and lower extremities are used to define a rectangular area that contains the footprint 200. A cropping box 608 is determined on the rectangular area by multiplying the length and width of the rectangular area by suitable cropping scalars $\alpha$ and $\beta$. Thus, $$X_c = \alpha(x_{max} - x_{min}) \quad \text{Eq. (5)}$$

and $$Y_c = \beta(y_{max} - y_{min}) \quad \text{Eq. (6)}$$

Where $X_c$ and $Y_c$ are a length and height of the cropping box 608, respectively. For illustrative purposes, $\alpha = 1.2$ and $\beta = 0.3$. With $\alpha > 1$, the length of the cropping box 608 extends outside of the leftmost and rightmost extremities of the footprint 200. The cropping box 608 is generally centered on the centroid 602.

Figure 7:
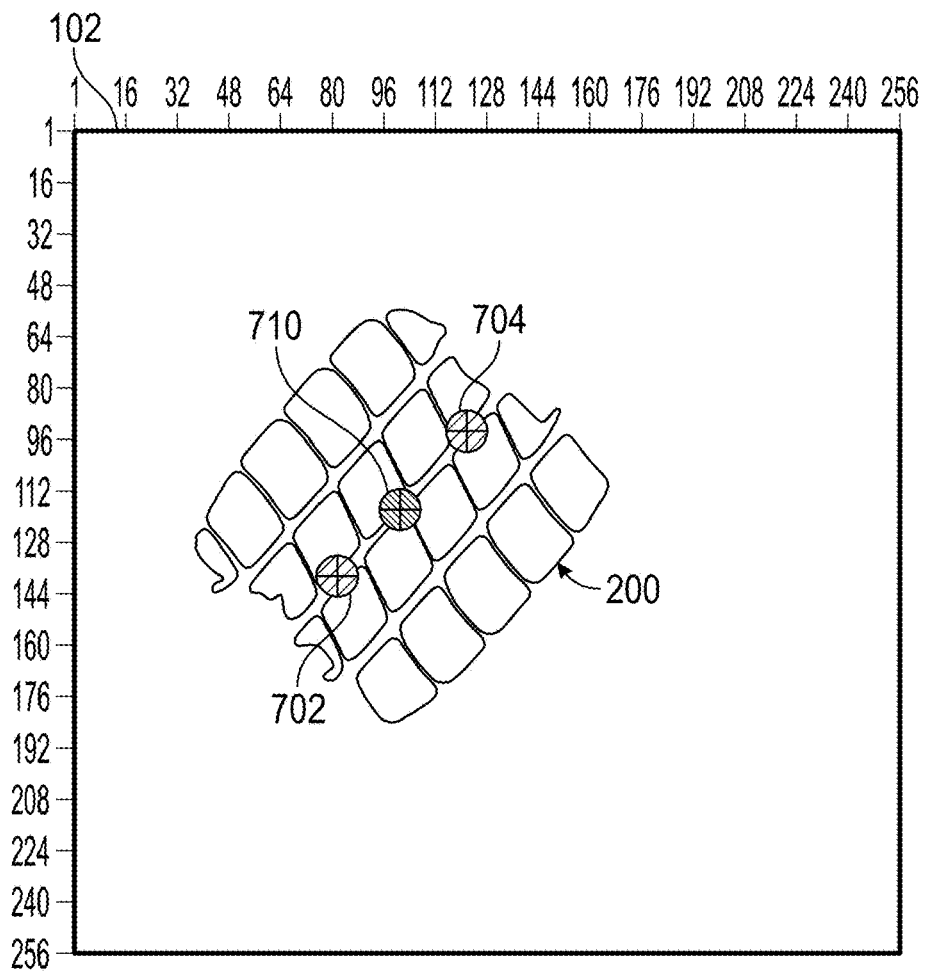
FIG. 7 shows a misaligned footprint having points manually selected in order to align the footprint along the coordinate axes.

FIG. 7 shows a misaligned footprint 200 having points manually selected in order to align the footprint along the coordinate axes. The operator selects two points 702 and 704 that form a line representative of a plane parallel or substantially parallel to the median plane of the tire. For example, the two points 702 and 704 are selected along a same rib edge of the footprint 200. The two points 702 and 704 are used to determine the misalignment angle $\theta$ which can be used to create a rotation matrix. The user then manually selects a point to represent a manually-selected centroid 710 of the tire footprint, represented by ($x_{00old}$, $y_{00old}$). The subscript 'old' refers to the original or misaligned footprint. The two points 702 and 704 and the manually-selected centroid 710 can be selected by mouse clicks or by touching the display at a selected location.

Figure 8:
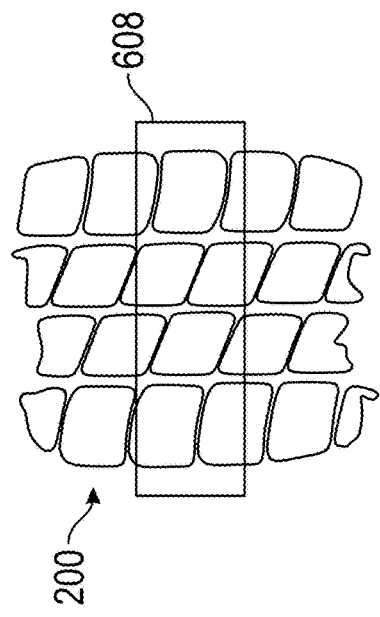
FIG. 8 shows a transformation of the footprint of FIG. 7 to a footprint that is aligned along the coordinate axes of a selected reference frame.

FIG. 8 shows a transformation of the footprint 200 of FIG. 7 to a footprint that is aligned along the coordinate axes of the desired reference frame geometrically congruent with that of the display 116. The transformation operation for the footprint can be written as:

$$\begin{pmatrix} x_{new} \\ y_{new} \end{pmatrix} = \begin{pmatrix} a_{00} & a_{01} \\ a_{10} & a_{11} \end{pmatrix}\begin{pmatrix} x_{old} - x_{old00} \\ y_{old} - y_{old00} \end{pmatrix} + \begin{pmatrix} x_{new00} \\ y_{new00} \end{pmatrix} \quad \text{Eq. (7)}$$

where ($x_{new}$, $y_{new}$) represents the coordinates of the transformed image, with the subscript 'new' referring to the transformed data. The centroid ($x_{00new}$, $y_{00new}$) of the transformed image can be selected by the operator. The light intensity 'z' of a pixel in the transformed image is related to the light intensity of a pixel of the original footprint by Eq. (8):

$$z(x_{new}, y_{new}) = z(x_{old}, y_{old}) \qquad \text{Eq. (8)}$$

FIG. 8 further shows a cropping box 608 that is selected by the operator after the transformation operation on the footprint 200. It should be noted while the transformation operation of Eqs. (7) and (8) are discussed with respect to the manual operation of FIGS. 7 and 8, the transformation operation can also be used by the processor as it performs the automatic transformation operation of FIGS. 5 and 6. After the transformation operation has been completed, a contrast level of the footprint 200 can be adjusted. In particular, the contrast level can be adjusted in order to obtain saturation at low intensity levels and at high intensity levels.

Figure 9:
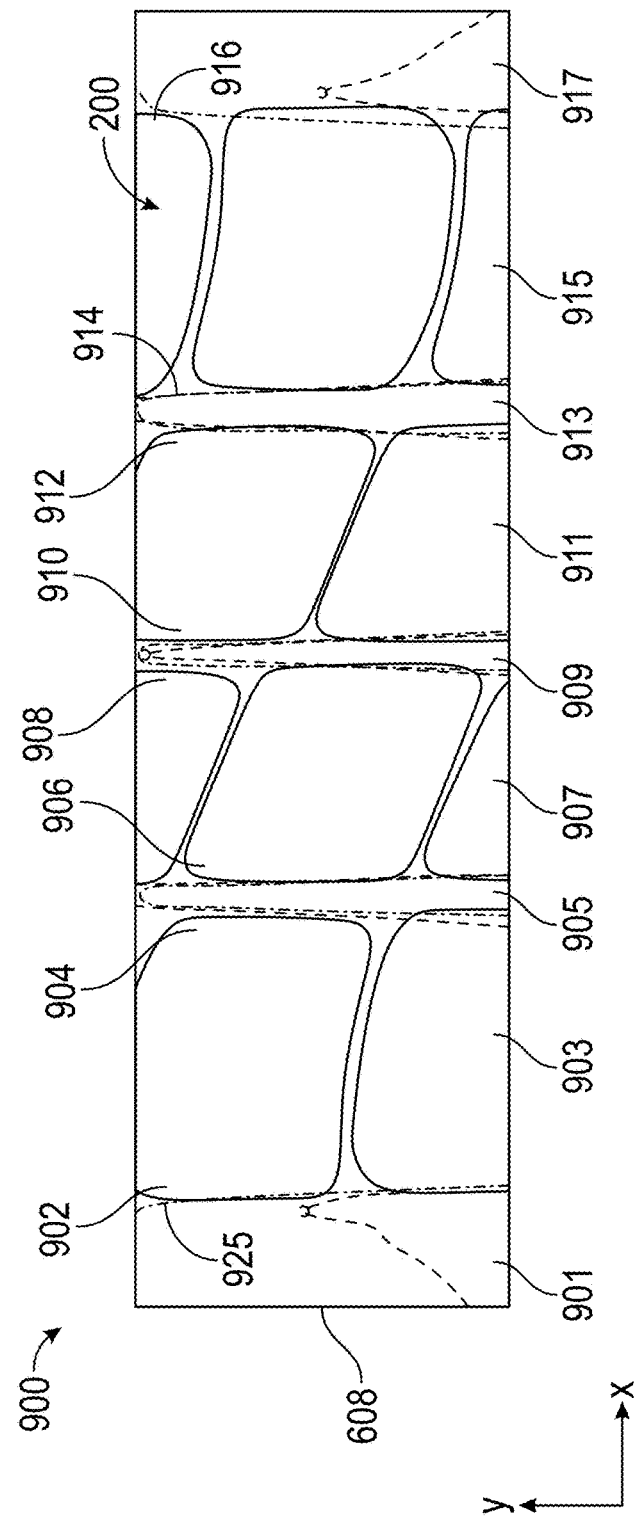
FIG. 9 shows a cropped region of an aligned footprint.

FIG. 9 shows a cropped region 900 of an aligned footprint 200. The cropping box 608 defines the cropped area of the footprint 200. The footprint 200 shows regions 901 and 917 that lie outside of the tire. The footprint 200 further shows, from left to right, first rib 903, second rib 907, third rib 911, and fourth rib 915. The first rib 903 and second rib 907 are separated by gap 905. The second rib 907 and third rib 911 are separated by gap 909. The third rib 911 and fourth rib 915 are separated by gap 913. The ribs have edges that are evident in the locations at which the intensity of the footprint changes. The first rib 903 has edges 902 and 904. The second rib 907 has edges 906 and 908. The third rib 911 has edges 910 and 912. The fourth rib 915 has edges 914 and 916. FIG. 9 further shows a mean intensity profile 925 for the footprint. The mean intensity profile 925 can be used to locate the edges of the ribs.

In order to obtain an intensity profile along the x-axis, a mean intensity function I(x) is created that is a function that averages the intensities of the cropped region 900 in the column represented by the x-coordinate. For each x-coordinate, the mean intensity function I(x) is an average over all or substantially all intensities in the column represented by the selected x-value, as shown in Eq. (9):

$$I(x) = \frac{\Sigma_y z(x, y)}{N_y} \qquad \text{Eq. (9)}$$

The summation notation indicates a summation of intensities for the values of 'y' for the selected x-value.
where $N_y$ is the number of pixels in the column represented by the x-coordinate. Dividing by $N_y$ provides a normalized value for the intensity function.

Once the intensity function I(x) has been determined for the x-coordinates of the cropped image, the intensity function is bandpass filtered to increase edge detectability and the signal-to-noise ratio of the intensity function. The filter can be a non-causal or zero lag filter. In one embodiment, a non-causal filter can be achieved using conventional lag-inducing filtering in both forward (+x) and reverse (−x) directions in two sequential steps.

A derivative is then taken of the filtered mean intensity profile. The derivative provides local peaks or extrema that indicate the locations at which the mean intensity function passes from a high intensity region to a low intensity or from a low intensity region to a high intensity region. In one embodiment, a local minimum indicates passes from a high intensity region to a low intensity region and a local maximum indicates passing from a low intensity region to a high intensity region. The derivative of the filtered mean intensity can also be filtered in order to improve detectability and a signal-to-noise ratio, in various embodiments.

Figure 10:
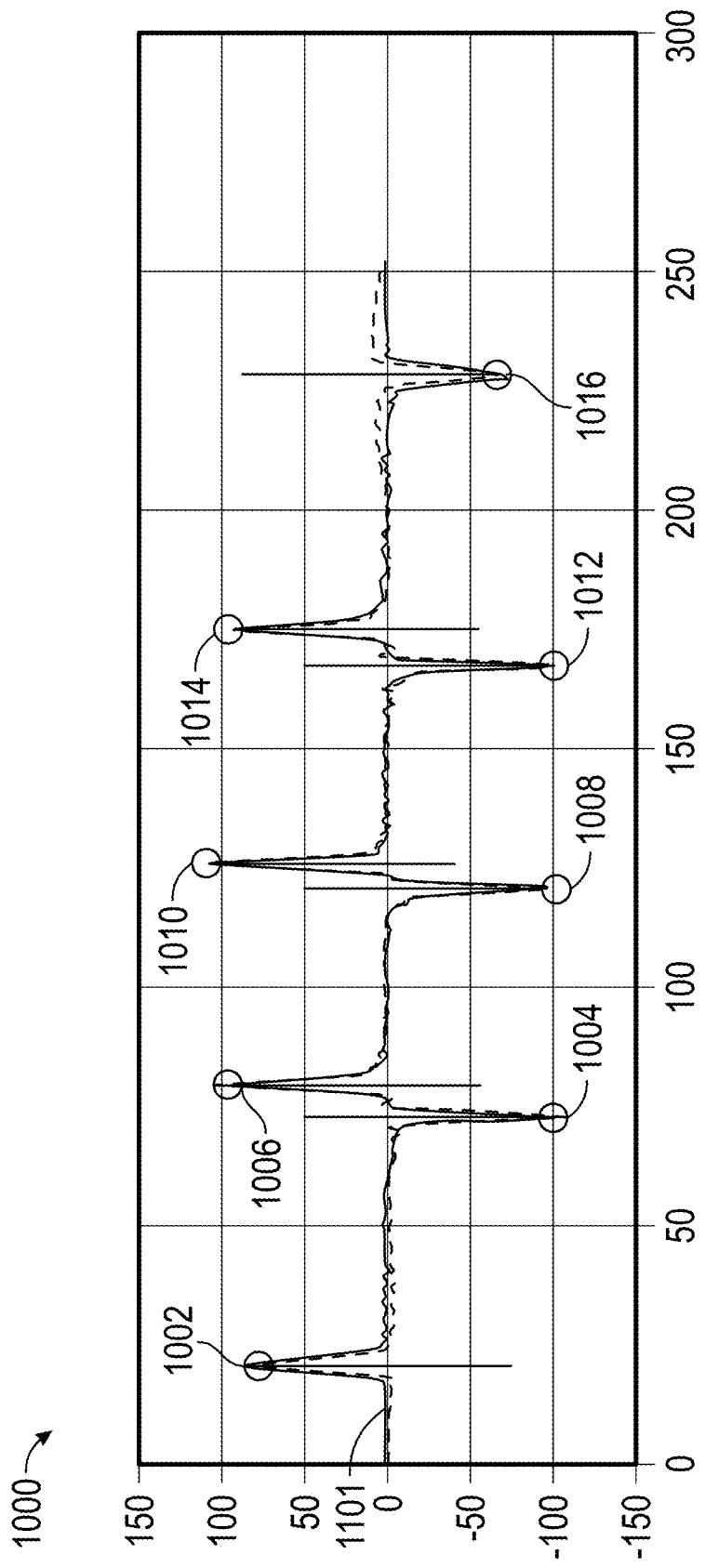
FIG. 10 shows a graph of a derivative of a filtered mean intensity profile of FIG. 9.

FIG. 10 shows a graph of the derivative 1000 of the filtered mean intensity profile. The values of the extrema of the derivative represent the border or rib edges that define the edge of the tread ribs. For example, maximum peak 1002 appears at the position of the leftmost edge 902 of the first rib 903 of FIG. 9 and minimum peak 1004 appears at the position of the rightmost edge 904 of the first rib 903. Similarly, maximum peak 1006 appears at the position of the leftmost edge 906 of the second rib 907 and minimum peak 1008 appears at the position of the rightmost edge 908 of the second rib 907. Maximum peak 1010 appears at the position of the leftmost edge 910 of the third rib 911 and minimum peak 1012 appears at the position of the rightmost edge 912 of the third rib 911. Finally, maximum peak 1014 appears at the position of the leftmost edge 914 of the fourth rib 915 and minimum peak 1016 appears at the position of the rightmost edge 916 of the fourth rib 915.

Figure 11:
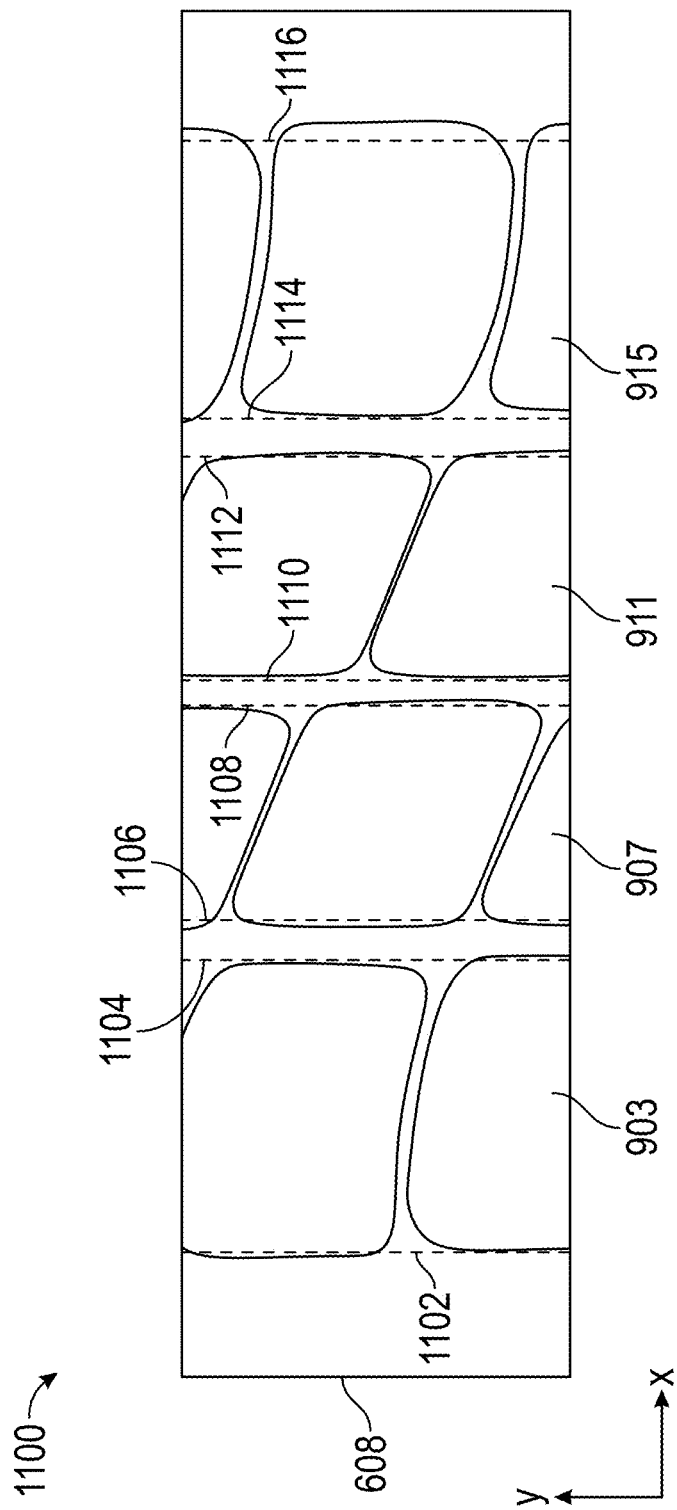
FIG. 11 shows the cropped region of FIG. 9 with superimposed tread rib edges.

Turning now to FIG. 11, cropped region 608 shows the four ribs of the cropped footprint from FIG. 9, now with superimposed tread rib edges. Lines have been drawn to represent the location of the rib edges. Lines 1102 and 1104 represent respective leftmost and rightmost edges of the first rib 903. Lines 1106 and 1108 represent respective leftmost and rightmost edges of the second rib 907. Lines 1110 and 1112 represent respective leftmost and rightmost edges of the third rib 911. Lines 1114 and 1116 represent respective leftmost and rightmost edges of the fourth rib 915.

Figure 12:
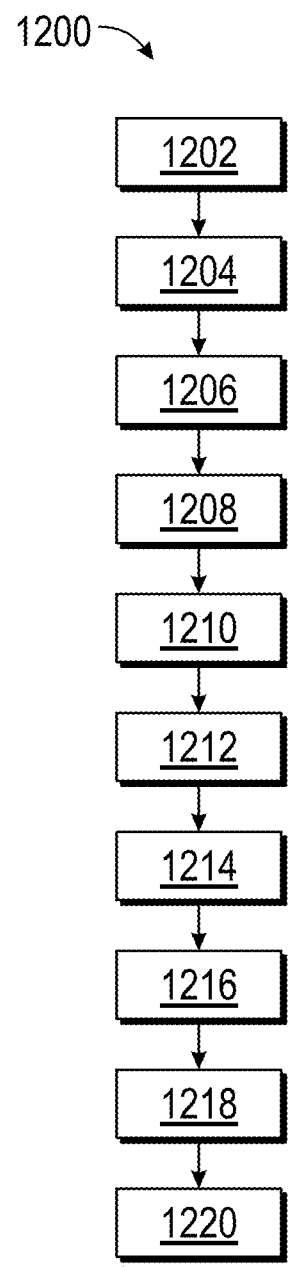
FIG. 12 shows a flowchart illustrating a method for determining the location of rib edges for a tire using a footprint obtained at a sensor.

FIG. 12 shows a flowchart 1200 illustrating a method for determining the location of rib edges for a tire using a footprint obtained at a sensor. In box 1202, a footprint of the tire is obtained using, for example, the sensor array 102. In box 1204, a location of a centroid of the footprint is determined with respect to the coordinate axes of the sensor array and a misalignment angle of the footprint with respect to the coordinate axis of the sensor array is determined. The centroid and misalignment angle can be determined either automatically by the processor or manually by an operator. In box 1206, a linear transformation is performed on the footprint to align the footprint along the axis of the sensor array. Performing the linear transformation involves one or more of a linear translation of the footprint and a rotation of the footprint using the determined centroid of the tire and misalignment angle. In box 1208, a contrast setting of the footprint is adjusted in order to obtain saturation at low intensity levels and high intensity levels. In box 1210, the image is cropped about the centroid of the footprint. In box 1212, a mean intensity profile is created along the x-direction or direction that perpendicularly crosses the tread ribs of the tire. In box 1214, the mean intensity profile is filtered using a first filter. In box 1216, a derivative is taken of the filtered intensity profile. In box 1218, a second filter is applied to the derivative. In box 1220, the peaks of the derivative are detected in order to determine the locations of the tread rib edges.

Once the location of tread rib edges have been determined, this data can be used to determine the quality of the tire. In one embodiment, the location of the tread rib edges determines the interaction of the tire with the road in creating issues such as groove wander. In one embodiment, a user can identify the tread rib edges of a candidate tire design that are responsible for excessive rain groove interaction and judiciously reposition the tread rib edges in order to avoid multiple coinciding tread rib edges with rain grooves of the road.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A computer-implemented method of determining a quality of a tire, comprising:
    capturing a footprint of the tire at a sensor array, the tire placed on the sensor array at a misalignment angle with respect to a coordinate axis of the sensor array;
    applying a geometric transformation at a processor to rotate the footprint to align with the coordinate axis;
    determining, at the processor, an intensity profile of the footprint, wherein the intensity profile is a profile of force measured at the sensor array along the coordinate axis of the sensor array;
    locating, at the processor, an edge of the tread rib of the tire from a change in intensity along the intensity profile; and
    determining, at the processor, a relative quality of the tire from the location of the tread rib edge;
    wherein the location of the tread rib edge is determined within a resolution beyond the resolution of the sensor array by obtaining the footprint at the misalignment angle.

2. The method of claim 1, wherein obtaining the footprint at the sensor array further comprises one of: (i) applying the tire to a face of the sensor array with static load; and (ii) rolling the tire across the face of the sensor array.

3. The method of claim 1, further comprising cropping the footprint about a centroid of the footprint.

4. The method of claim 3, further comprising locating the tread rib edge from a location of an extremum of a derivative of the intensity profile.

5. The method of claim 1, wherein the intensity profile is an intensity along a direction transverse to the tread ribs of the tire and the intensity at a selected location is an average of intensities recorded along a tread rib direction at the selected location.

6. An apparatus for determining a quality of a tire, comprising:
    sensor array configured to capture a footprint of the tire placed thereon at a misalignment angle with respect to a coordinate axis of the sensor array; and
    a processor configured to:
    apply a geometric transformation to rotate the footprint to align with the coordinate axis,
    determine an intensity profile of the footprint, wherein the intensity profile is a profile of force measured at the sensor array along the coordinate axis of the sensor array,
    locate an edge of the tread rib of the tire from a change in intensity along the intensity profile, and
    determine from the location of the tread rib edge a relative quality of the tire;
    wherein the location of the tread rib edge is determined within a resolution beyond the resolution of the sensor array using the misalignment angle of the tire with the coordinate axis of the sensor array.

7. The apparatus of claim 6, wherein the sensor array is configured to obtain the footprint by one of: (i) receiving the tire at a face of the sensor array with an applied static load; and (ii) having the tire rolled across the face of the sensor array.

8. The apparatus of claim 6, wherein the processor is further configured to crop the footprint about a centroid of the footprint.

9. The apparatus of claim 6, wherein the processor is further configured to create the intensity profile along a direction transverse to the tread ribs of the tire wherein the intensity at a selected location is an average of intensities record along a tread rib direction at the selected location.

10. The apparatus of claim 9, wherein the processor is further configured locate the edge from a location of an extremum of a derivative of the intensity profile.

11. A computer-program product for determining a quality of a tire, the computer program product comprising a non-transitory computer readable storage medium, the non-transitory computer readable storage medium comprising computer executable instructions, wherein the non-transitory computer readable storage medium comprises instructions to:
    capture a footprint of the tire placed on a sensor array at a misalignment angle with respect to a coordinate axis of the sensor array;
    apply a geometric transformation to rotate the footprint to align with the coordinate axis,
    determine an intensity profile of the footprint, wherein the intensity profile is a profile of force measured at the sensor array along a direction of the coordinate axis;
    locate an edge of the tread rib of the tire from a change in intensity along the intensity profile; and
    determine from the location of the tread rib edge a relative quality of the tire;
    wherein the location of the tread rib edge is determined within a resolution beyond the resolution of the sensor array using the misalignment angle of the tire with the coordinate axis of the sensor array.

12. The computer-program product of claim 11, wherein the non-transitory computer readable storage medium further comprises instructions to crop the footprint about a centroid of the footprint.

13. The computer-program product of claim 11, wherein the non-transitory computer readable storage medium further comprises instructions to create the intensity profile along a direction transverse to the tread ribs of the tire and-the intensity at a selected location is an average of intensities record along a tread rib direction at the selected location.

14. The computer-program product of claim 13, wherein the non-transitory computer readable storage medium further comprises instructions to locate the tread rib edge from a location of an extremum of a derivative of the intensity profile.

* * * * *